United States Patent [19]
Sjogren et al.

[11] Patent Number: 6,086,308
[45] Date of Patent: Jul. 11, 2000

[54] CART HANDLING SYSTEM

[75] Inventors: Christer A. Sjogren, Miami; Jeffrey A. Bond, Plantation, both of Fla.

[73] Assignee: Quipp Systems, Inc., Miami, Fla.

[21] Appl. No.: 08/910,643

[22] Filed: Aug. 13, 1997

[51] Int. Cl.[7] ................................. B65G 37/00
[52] U.S. Cl. .................. 414/373; 414/397; 198/465.2; 198/580
[58] Field of Search .................. 414/373, 397; 198/465.2, 580

[56] References Cited

U.S. PATENT DOCUMENTS

| | | | |
|---|---|---|---|
| Re. 35,555 | 7/1997 | Sjogren et al. | 414/331 |
| 1,404,947 | 1/1922 | Fitch | 414/373 X |
| 3,642,158 | 2/1972 | Koennecke et al. | 198/465.2 X |
| 3,750,593 | 8/1973 | Zetterlund | 104/172 BT |
| 3,822,646 | 7/1974 | Rosenberger | 104/88 |
| 3,851,778 | 12/1974 | Schurch | 414/622 |
| 4,234,281 | 11/1980 | Lanham et al. | 414/37 |
| 5,090,555 | 2/1992 | Kura | 198/465.2 X |
| 5,181,820 | 1/1993 | Sjogren et al. | 414/331 |
| 5,195,629 | 3/1993 | Gottstein et al. | 198/465.2 |
| 5,271,490 | 12/1993 | Sticht | 198/465.2 X |
| 5,743,962 | 4/1998 | Ogasawara et al. | 198/465.2 X |

FOREIGN PATENT DOCUMENTS

0 256 926   2/1988   European Pat. Off. ............ 198/465.2

*Primary Examiner*—Robert P. Olszewski
*Assistant Examiner*—Gerald J. O'Connor
*Attorney, Agent, or Firm*—Louis Weinstein

[57] ABSTRACT

Wheeled carts are pushed onto an inlet end of a conveyor and are automatically advanced, one at a time, to a cross conveyor for delivery to a cart loader conveyor. A cart loader is provided near the outlet end of the cart loader conveyor for automatically loading bundles into a wheeled cart. The input conveyor advances wheeled carts one cart position at a time. Cart positions along the input conveyor are monitored by sensors to automatically control advancement of wheeled carts therealong. A cart delivered from the outlet end of the input conveyor to the cross conveyor activates a cross conveyor limit switch advancing the cart delivered thereto to a position for feeding a wheeled cart onto the cart loader conveyor. A limit switch is actuated when the wheeled cart reaches this position where upon a push bar pushes the cart activating the limit switch onto the cart loader conveyor. The conveyor system in cart handling are preferably operated by hydraulic devices due to their compactness.

15 Claims, 6 Drawing Sheets

CART HANDLING SYSTEM

FIELD OF THE INVENTION

The present invention relates to a cart handling/cart loading system and more particularly to a novel automated system for delivering carts from an input conveyor to a cart loader by a cross conveyor and loading the delivered carts automatically.

BACKGROUND OF THE INVENTION

Cart loaders have been developed and are presently in use for automating the loading of bundles into carts. One such system is described in U.S. Pat. No. Re. 35,555, issued Jul. 8, 1997, and assigned to the assignee of the present application, which patent is incorporated herein by reference thereto. In addition to automating the loading of bundles into wheeled carts, it is desirable to provide a system for automating the handling of carts and which is capable of receiving carts, storing carts and selectively forwarding stored carts to the cart loader as well as delivering loaded carts to an outfeed location, as well as withdrawing empty carts stored within the system. It is further desirous to provide such a system which is comprised of a substantially self-contained supporting structure providing advantageous structural strength and which is constructed in such a manner as to avoid the need and expense of providing a special floor for the system which typically entails the preparation of deep trenches within the surface of the floor receiving and supporting such a system.

BRIEF DESCRIPTION OF THE INVENTION

The present invention is characterized by comprising a cart conveyor/cart loader system for automatically receiving and advancing carts to a cart loader and wherein the cart handling system, in one preferred embodiment, is operated by hydraulic motors.

The system may be comprised of one or more cart conveyors each of which receives wheeled carts at an input end and delivers carts to a cross conveyor which receives carts from output ends of the cart conveyors. Delivery of a wheeled cart to the cross conveyor automatically activates the cross conveyor to deliver the wheeled cart to a location adjacent to an input end of a cart loader conveyor. A sensor automatically activates a pusher which pushes the wheeled cart from the cross-conveyor onto the cart loader conveyor when activated by a cart delivered to the cross conveyor. The cart loader conveyor sensor senses the presence of a cart and advances the sensed cart to the loading position of the cart loader.

The cart input conveyor and the cart loader conveyor are respectively provided with sensors, which automatically operate blocking members to prevent the wheeled carts from advancing to a cart position which is already occupied.

The cart loader receives bundles and conveys the bundles delivered thereto by means of a conveyor to a bundle assembly platform. Bundles are pushed onto the platform, typically to arrange four bundles in a two-by-two arrangement, two sets of two bundles each being sequentially pushed onto a platform from the conveyor. When a two-by-two array of four (4) bundles is pushed onto the platform, the platform is opened to drop the four bundle array onto a set of tines of a fork-like member extending into the cart.

The fork-like member is initially positioned just below the platform and, after receiving the first two-by-two bundle array, for example, is lowered by an amount sufficient to receive a second layer of bundles, which are formed on the platform in the same manner that the first layer of bundles is formed. This procedure is repeated for the desired number of bundle layers (which may be between 1 and 8 layers) whereupon the fork-like member has either reached the floor of the wheeled cart or is moved to the floor of the wheeled cart to be withdrawn from the cart, which preferably has at least one side provided with vertically aligned clearance slots, each receiving one of the tines of the fork-like member.

When the wheeled cart is fully loaded or loaded with the desired number of bundles, the fork-like member is withdrawn from the cart and is then raised to the upper starting height and then moved horizontally to the starting position just beneath the platform, in readiness for loading another wheeled cart. Vertical members adjacent to the clearance slots "strip" the bundles from the fork-like member and retain the bundles within the cart.

The conveyor delivering bundles to the assembly platform is preferably provided with a pair of conveyor belts having sensors extending upwardly between adjacent longitudinal sides of the conveyor belts. Plural sets of holding members are arranged along opposite sides of the conveyor for temporarily holding a bundle therebetween until the two downstream bundles are pushed onto the platform and the pusher is returned to its start position. The surface of the conveyors has a low coefficient of sliding friction to prevent the bundles being held from being torn or damaged.

OBJECTS OF THE INVENTION

One object of the present invention is to provide a cart handling system characterized by comprising a fully self-contained wheeled cart conveyor/cart loader system for automatically advancing carts delivered thereto along an input conveyor and delivering carts from each input conveyor by way of a cross conveyor to a cart loader conveyor.

Still another object of the present invention is to provide a cart conveyor/cart loader system in which carts are automatically advanced along the input conveyor to cart positions therealong and to prevent wheeled carts from being advanced therealong to cart positions which are occupied.

Still another object of the present invention is to provide a novel cart conveyor/cart loader system utilizing hydraulic motors.

Still another object of the present invention is to provide a novel cart conveyor/cart loader system in which the cart loader is provided with hydraulic devices for lowering bundles into a wheeled cart.

BRIEF DESCRIPTION OF THE FIGURES

The above as well as other objects of the present invention will become apparent when reading the accompanying description and drawings in which.

DETAILED DESCRIPTION OF THE INVENTION AND PREFERRED EMBODIMENTS THEREOF

Figure 4:
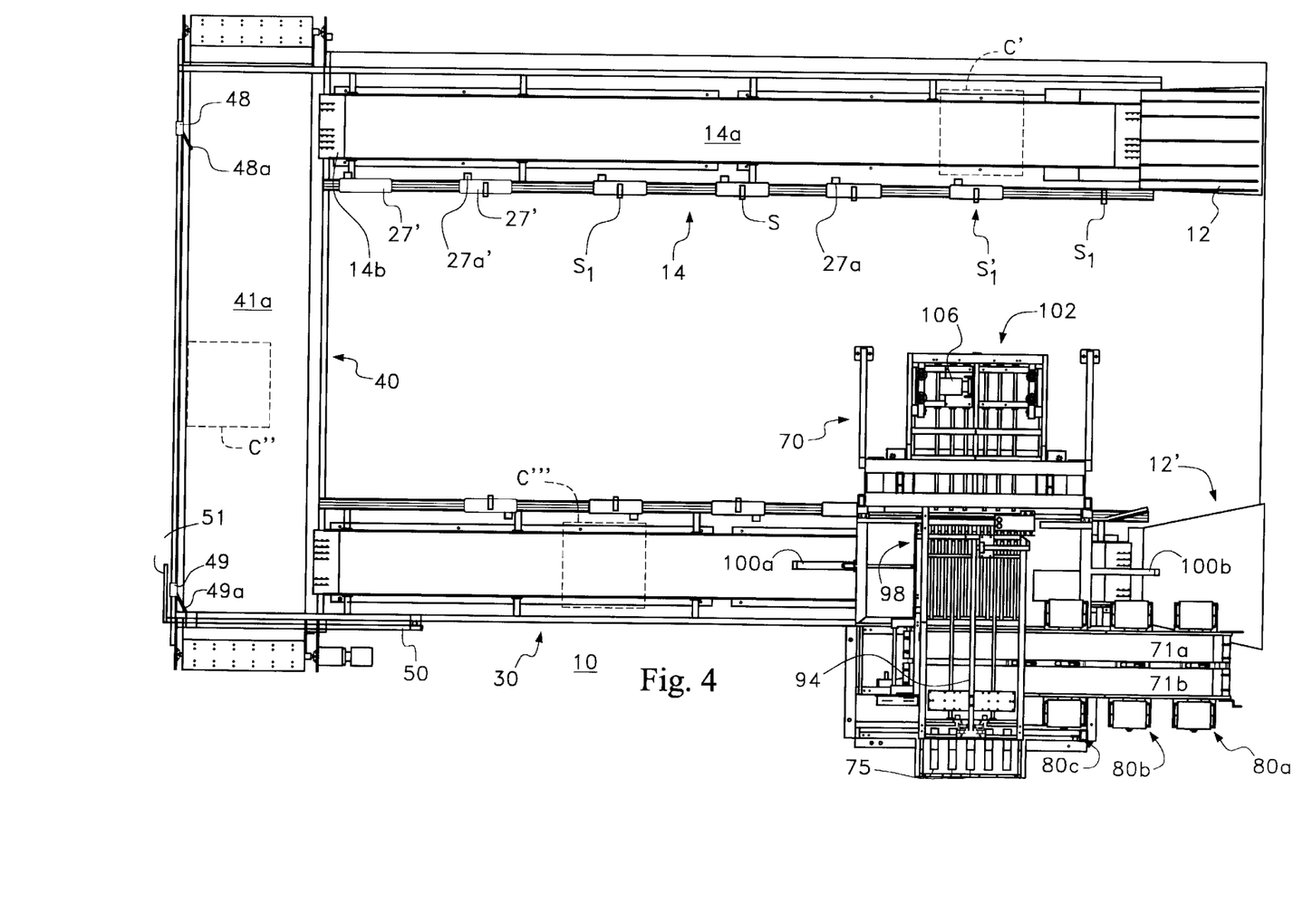
FIG. 4 is a top plan view of the cart conveyor/cart loader system of FIG. 1.
Figure 4A:
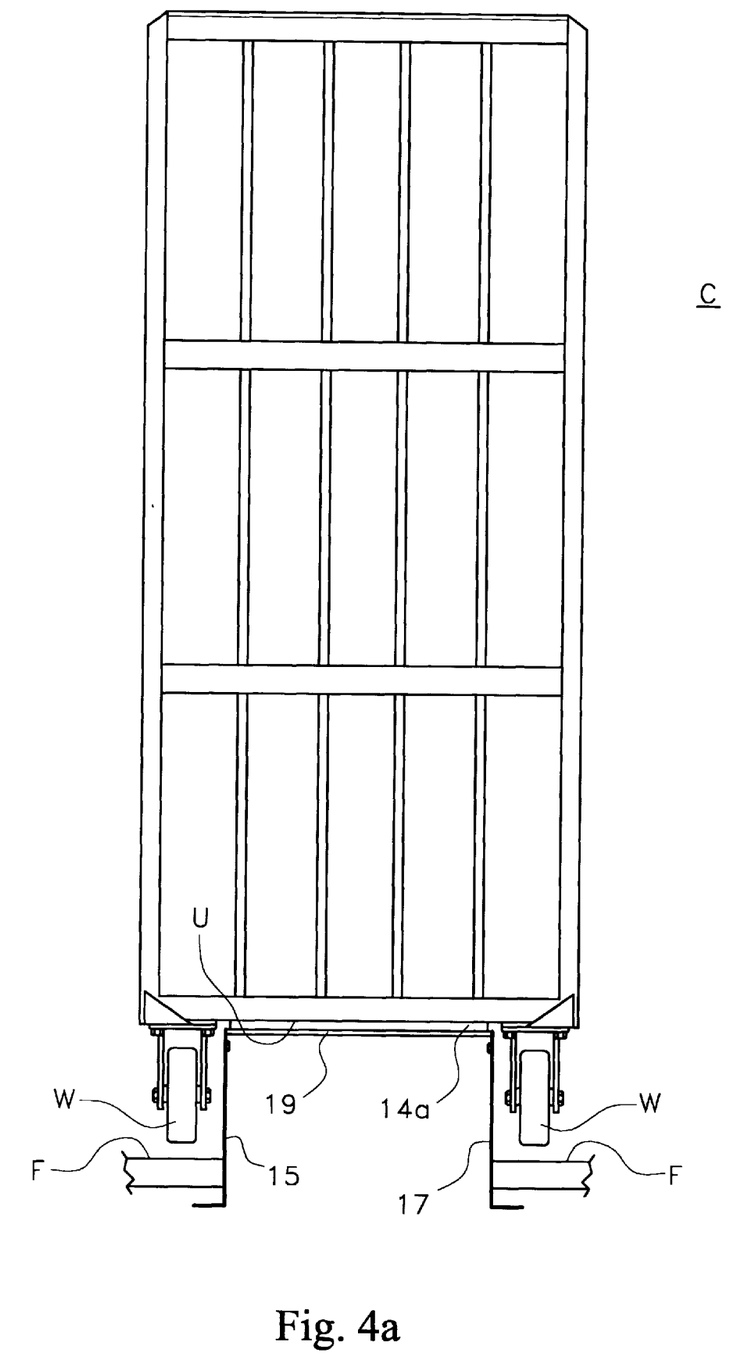
FIG. 4a is an elevational view of a cart supported by conveyor 14 shown in FIG. 1.
Figure 5:
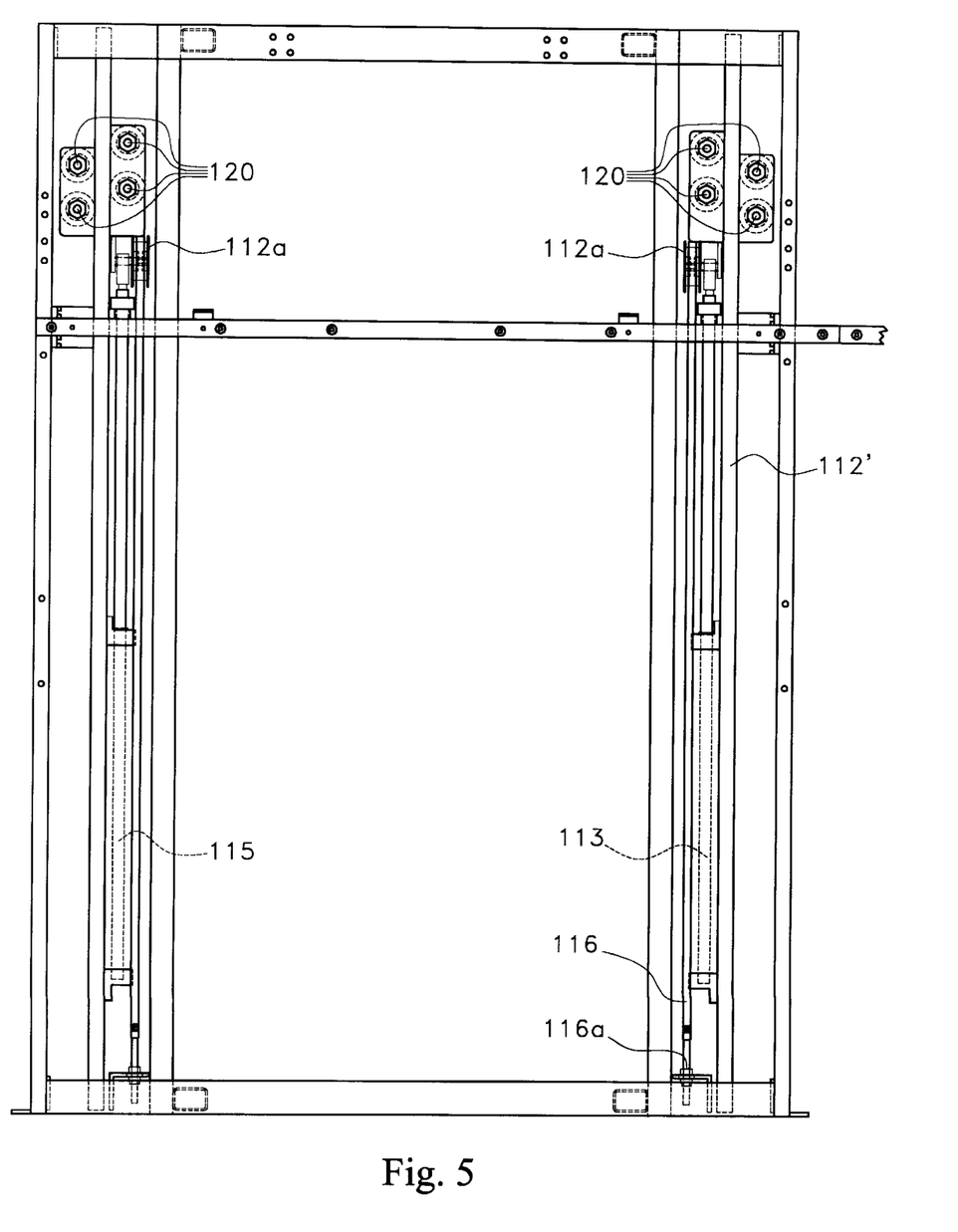
FIG. 5 is an elevational view of a portion of the cart loader shown in FIG. 1.

FIGS. 1–4a show a cart conveyor/cart loader system 10 designed to handle wheeled carts of the type described in U.S. Pat. No. 5,181,820 issued Jan. 26, 1993 and assigned to the assignee of the present application. The wheeled carts C one of which is shown in FIG. 4a are moved to an input ramp 12. Ramp 12 is of a width sufficient to receive the wheels W of each cart and to raise each cart so that the undersurface of the cart platform engages the upper run 14a of cart conveyor 14. The conveyor belt of the upper run is of a width which is less than the distance between the casters on opposite sides of the cart C so that the casters straddle the upper run 14a. The underside of the cart engages upper run 14a which is arranged so that its height is slightly greater than the distance between the surfaces of the wheels of the wheeled cart which would engage a floor F and the undersurface of the floor of the cart to be assured that the wheels are lifted to a position above and displaced from a supporting surface whereby the cart rests on the conveyor upper run 14a which exerts a driving force upon the cart C as it advances along the upper run 14a in the direction shown by arrow A.

Assuming that there are no wheeled carts on conveyor 14, the conveyor is normally at rest. Sensor S1 detects delivery of a wheeled cart from ramp 12 onto the input end of the upper run 14a to automatically start conveyor 14 and advance the cart, which activates sensor S1, downstream along the upper run 14a.

The motor operating conveyor 14 is a hydraulic motor located at the downstream end 14b of conveyor 14 and is designed to move the upper run 14e in the direction of arrow A.

The conveyor 14 has first and second elongated side plates 15 and 16 arranged end-to-end on the left-hand side of the conveyor and a similar pair of side plates 17 and 18 arranged end-to-end on the right-hand side of conveyor 14. The side plates 15–16/17–18 are maintained in spaced parallel fashion by suitable internal spacers (not shown) spanning between the plates 15 and 17 and plates 16 and 18. Rollers 20 and 21 are respectively provided at the upstream and downstream ends of conveyor 14 and are each mounted to rotate upon a shaft, which is preferably journaled within bearings provided in the plates 15–18. The conveyor may be of the type known as a MATTETOP conveyor manufactured by the INTRALOX company. The motor for driving conveyor 14 is preferably a low profile hydraulic motor, which has an outer diameter in the range of 4½ to 6½ inches, enabling the conveyor 14 to be placed upon a supporting surface such as a floor without the necessity for providing or forming a trench or other like excavation which would otherwise be required to house the drive motor and still maintain a low profile conveyor whose height above the floor is typically 12 inches.

The conveyor 14 is provided with an elongated support surface 19 which: (a) is secured to side plates 15–17 and 16–18; (b) is arranged just beneath the conveyor upper run 14a; and (c) supports the conveyor upper run in the region between the inlet and outlet ends. The conveyor surface resting on support surface 19 has a low coefficient of sliding friction.

Figures 1, 1A:
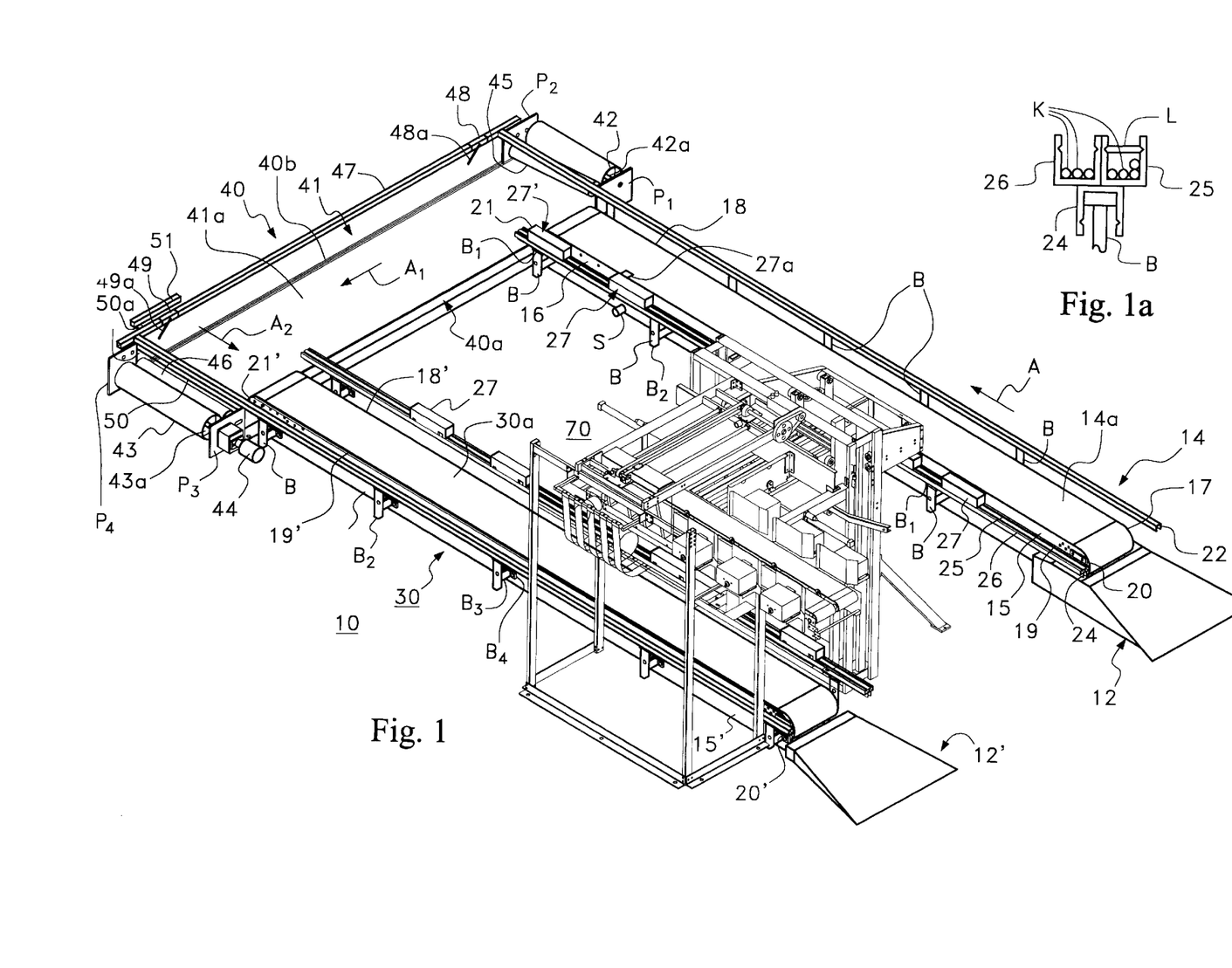
FIG. 1 is a perspective view showing a cart conveyor/cart loader system embodying the principles of the present invention.
FIG. 1a shows a schematic end view of the U-struts employed in the system of FIG. 1.
Figure 2:
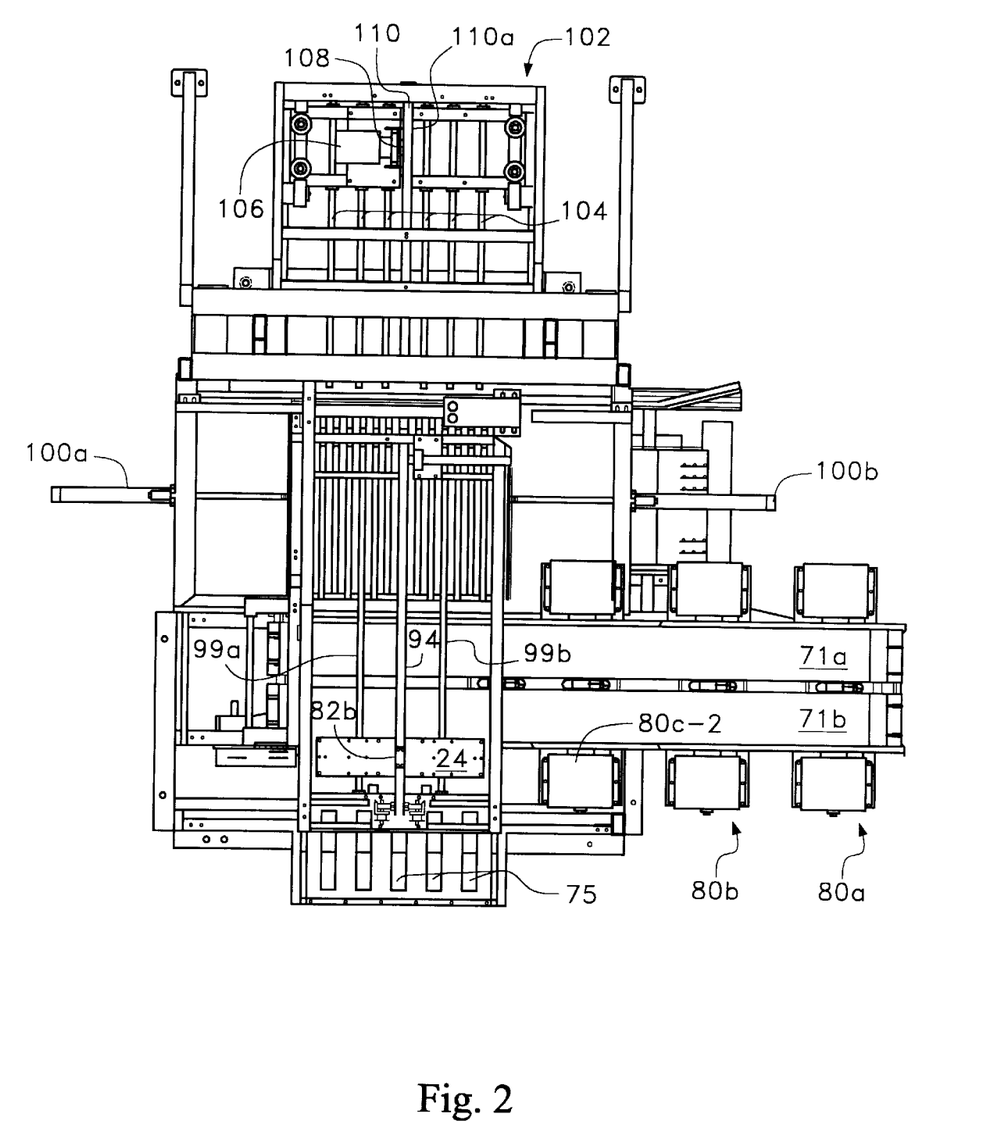
FIG. 2 shows a top view of the cart loader of FIG. 1.
Figure 3:
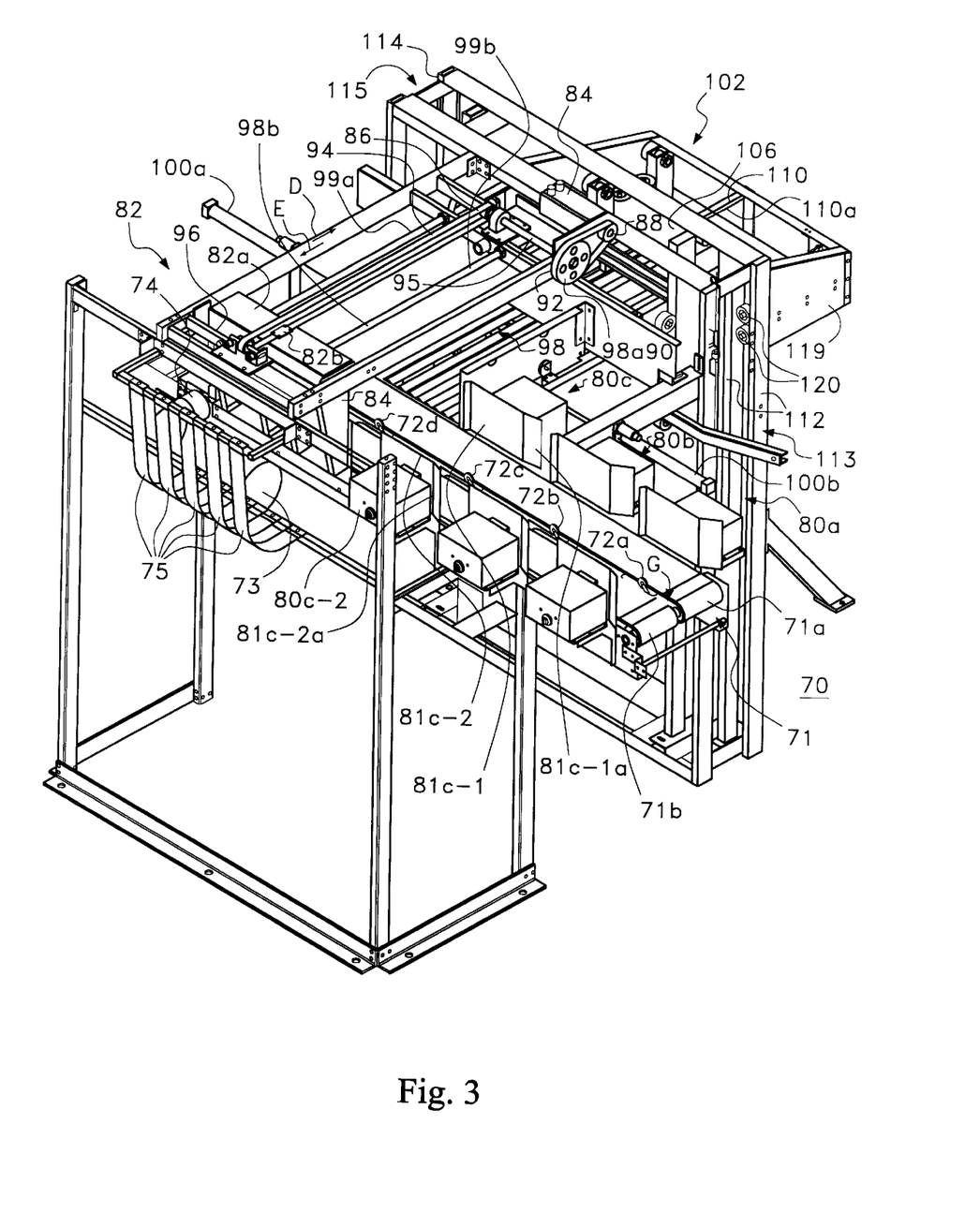
FIG. 3 is a perspective view showing the cart loader of FIG. 1 in greater detail.

A plurality of support brackets B are arranged at spaced intervals along the left-and right-hand sides of conveyor 14. An upper end B1 of each bracket respectively supports an inverted channel 22 and 24 respectively provided along the right and left-hand sides of conveyor 14. The horizontally aligned upper end B1 of each bracket B is inserted into its associated channel 20 and 22, as shown in FIG. 1a. The lower vertically aligned end B2 of each bracket rests on the supporting surface. A horizontally aligned arm B3 extends at right angles from the upright portion and its free end is provided with a T-shaped mounting flange B4 secured to an associated one of the side plates 15–18.

A pair of elongated uni-strut channels 25, 26 are arranged side-by-side and their base portions are secured to the base portion of inverted uni-strut 20, as shown in FIG. 1b. The channels 25 and 26 are utilized to accommodate electrical and/or pneumatic cabling and thus totally eliminate the need for drilling holes therealong. Each of the side walls of uni-struts 25 and 26 are notched along their interior vertical surfaces to slidably receive a cover lid L, as shown in FIG. 1a, which exposes the hydraulic and/or electric conduits K arranged within the uni-strut structures 25 and 26.

A plurality of blocking lug assemblies 27 are secured at spaced intervals upon the top of the uni-struts 25 and 26, each having a pneumatically operated blocking lug 27a, which is selectively moved from a position displaced from the left-hand edge of the upper run 14a of the conveyor to a second position so as to overlie a portion of the conveyor upper run 14a and thereby extend into the path of a wheeled cart being carried by the conveyor for preventing movement of a cart beyond a blocking lug moved to the blocking position. The operation of the sensors S and blocking lug assemblies 27 will be described in detail hereinbelow.

When a cart is pushed onto the infeed ramp 12, sensor S1 detects the presence of a cart to initiate movement of the infeed conveyor 14.

In the event that there are no carts on the input conveyor 14, the cart pushed on to the conveyor 14 may be fed to the last cart position adjacent to the cross conveyor 40 in order to store carts thereon preparatory to delivering a cart to the cart loader by way of the cross-conveyor 40 and the outfeed conveyor 30. The blocking lug 27a of the downstream unit $27^1$ blocks the cart from moving off of the infeed conveyor 14a and onto cross conveyor assembly 40. If another cart is loaded onto the conveyor, blocking lug $27a^1$ prevents the first cart from being delivered to the cross conveyor assembly 40 while infeed conveyor 14 is operating. The coefficient of sliding friction between the underside of the cart and the upper run 14a is sufficiently small to enable the conveyor to slide beneath the cart held by the blocking lug so as to deliver the next cart on ramp 12 onto the infeed conveyor.

As was previously described, the height of the upper run 14a is sufficient to displace the wheels of the carts above the supporting surface, the upper run 14a (through the support plate 18), suspending the wheels of each cart above the floor.

When it is desired to deliver a cart C on the infeed conveyor 14 to the cart loader 70 through the outfeed conveyor 30, the stop $27a^1$ is withdrawn while the conveyor is operating causing the downstream-most cart to be delivered onto the cross conveyor 40.

When it is desired to withdraw a stored cart from conveyor 14, the hydraulic motor is reversed. The blocking lugs may be withdrawn or alternatively may be free to move in the reverse direction without being released by a solenoid, when a cart moving backwards pushes against a blocking lug.

As was described hereinabove, the height of the cross conveyor relative to the infeed conveyor is such that a cart is delivered onto the cross conveyor 40 from infeed conveyor 14 so that the wheels are supported by the upper run of the cross conveyor. The cart C" is caused to move to the left-hand end of the cross conveyor (relative to FIG. 4) due to the tilted alignment of the cross conveyor. The cart thus engages the detector arm 48a of limit switch 48 which causes the cross conveyor hydraulic motor to be turned on, delivering the cart to the downstream end thereof. When the cart reaches the position of limit switch 49, limit switch arm 49a is deflected by the cart which causes the hydraulic motor driving cross conveyor 40 to be turned off and which actuates cylinder 50 causing the push arm 51 to push the cart which has activated limit switch 49 onto the upstream end of outfeed conveyor 30. The outfeed conveyor motor is activated causing the cart C'" to be moved downstream. The cart will be delivered so as to occupy a position immediately beneath the platform assembly 98 in readiness for being loaded with bundles. In the event that a cart is in the position beneath the cart loader platform assembly 98, this condition is sensed causing the stop member directly upstream of the cart being loaded to be projected to prevent the outfeed conveyor assembly 30 from delivering a cart to the cart loading position. The outfeed conveyor 30 supports each cart so that its wheels are displaced from contacting the floor, similar to conveyor 14.

To withdraw an empty cart from infeed conveyor 14, the conveyor drive motor is operated in the reverse direction to drive a cart back onto the infeed ramp 12. Alternatively, empty carts may be delivered from the outfeed conveyor 30 to outfeed ramp $12^1$ during the time that the cart loader 70 is idle.

The cart loader conveyor 30 is substantially the same in design and function as the input conveyor 14, having side plates 15'–18', support surface 19', rollers 20' and 21' and conveyor upper run 30a, brackets B', unistruts 22', 24', 25' and 26', sensors $S^1$, blocking lug assemblies and a ramp 12', all of which operate in substantially the same manner as like units of the input conveyor 14, the only difference being that carts are delivered from the cross conveyor (to be more fully described) to the cart loader 1 conveyor 14 delivering carts to the cross-conveyor.

Cross conveyor 40 spans between input conveyor 14 and conveyor 30 which delivers carts from cross conveyor 40 to the cart loader 70 (to be more fully described).

Cross conveyor 40 is comprised of enclosed loop conveyor belt 41 entrained at its upstream end about a large diameter roller 42, journal in bearings so as to be free-wheelingly rotatable, the central shaft 42a thereof being supported by a pair of plates P1 and P2.

The downstream end of the conveyor belt 41 is entrained about a second large diameter roller 43 rotatable about a shaft 43a mounted between plates P3 and P4 and driven by hydraulic motor 44. A downstream roller 45 is mounted to free wheelingly rotate between plates P1 and P2 and urges the upper run 41a of conveyor belt 41 about the underside of roller 45 to cause the upper run to extend just above the lower run. In a similar fashion, roller 46 is mounted to free wheelingly rotate between plates P3 and P4. Conveyor belt 41 moves beneath roller 46 which serves in the manner similar to roller 45, to maintain the upper run 41a of close loop conveyor belt 41 to be positioned just above the lower run thereof. A suitable plate, arranged between the upper and lower runs, and not shown for purposes of simplicity, serves as a support for upper run 41a.

The cross conveyor 40 functions to move a wheeled cart delivered thereto by in-feed conveyor 14 to the in-feed end of output conveyor 30. The conveyor assembly 40 is tilted so that its right-hand edge 40a is somewhat higher than its left-hand edge 40b. The width of conveyor belt 41, measured in the cross direction, is greater than the distance between a first pair of wheels of the cart aligned with edge 40b and a second pair of wheels of the cart aligned with right-hand edge 40a, assuring that the wheels in all four corners of the cart rest upon the upper run 41a of the closed loop conveyor 41.

When a cart is delivered from the in-feed conveyor 14 onto the cross conveyor 40, due to the tilt of the upper run 41a, the cart is assured of rolling at least slightly downwardly along the upper run so as to engage the rail 47. A sensor 48 having sensor arm 48a engages a side of the cart causing sensor 48 to be activated to indicate the presence of a cart. This activation causes energization of the hydraulic motor 44, moving the upper run 41a of the conveyor 40 in the direction of arrow A1, thereby moving the cart delivered thereto in the direction of the outfeed conveyor 30 for delivering carts to the cart loader assembly 70.

When the cart moving along the cross conveyor 40 arrives at the downstream end, sensor arm 49a of downstream sensor 49 is engaged by the side of the cart adjacent cross rail 47, the sensor 49 activates a cart push cylinder 50 which includes a piston 50a whose free end is joined to a pusher arm 51 causing the cart which is activated the arm 49a of the sensor 49 (which is preferably a limit switch) causing the pusher arm to push the cart which is activated limit switch arm 49a onto the infeed end of the conveyor 30 which conveys carts to the cart loader 70. In a manner similar to the ramp 12, the cart in the downstream position is moved onto the upstream end of conveyor 30 so that the wheels thereof are displaced from the service upon which the assembly is mounted to assure that the upper run 30a of the closed loop conveyor 30 moves carts delivered thereto in the direction of cart loader 70. Conveyor 30, similar to conveyor 14, moves a cart from each cart position to the next succeeding position only when the next succeeding cart position is unoccupied.

Ultimately, the cart delivered to conveyor 30 is moved to the loading position within cart loader assembly 70.

Cart loader assembly 70 is comprised of a bundle conveyor 71 comprised of a pair of side-by-side conveyors 71a and 71b separated by a small gap G. A plurality of limit switch-type sensors 72a, 72b, 72c and 72d, each having a roller member at the free end thereof are arranged at spaced intervals along gap G.

Conveyors 71a and 71b operate in unison under control of an electric motor 73 driving a gear train 74 for coupling rotational drive to the upstream end of the closed loop conveyors 71a, 71b which are entrained about a pair of upstream rollers 75a, 75b mounted upon a common shaft 76 driven by electric motor 73 through gear train 74.

The downstream ends of the conveyors 71a, 71b are entrained about a pair of rollers 77a, 77b mounted about a common shaft 78, which rollers are journaled to freewheelingly rotate under control of movement of the conveyors 71a, 71b, which are driven in the direction of arrow A3.

The upstream end of conveyor 71 mates with the downstream end of a suitable ramp conveyor for delivering bundles either from a position above conveyor 71 or below conveyor 71 (see U.S. Pat. No. Re. 35,555). Bundles, which may typically be newspaper bundles, are delivered in sequence along conveyor 71 and to a location near the downstream end thereof, which location is designed, in the preferred embodiment, to push one or two bundles in a direction transverse to arrow A3 onto a platform assembly to be more fully described for dropping the bundles into the open upper end of a cart.

Bundles are delivered in tandem to split conveyor 71a, 71b and are moved downstream therealong. As bundles move along conveyor 71a, 71b, they cause the spring loaded sensors 72a–72d to be selectively lowered, thereby indicating the presence of a bundle. The delivery of two bundles at a time is assured through the use of the selectively-actuated holding assemblies 80a, 80b and 80c, each of which is provided with a pair of driving members for moving a pair of plates. Since each of the holding assemblies are substantially identical in design and function, only one of these holding assemblies will be described herein for purposes of simplicity.

Holding assembly 80c has a pair of driving members 80c-1 and 80c-2 each driving a pair of plates 81c-1, 81c-2 which are driven toward one another to temporarily hold a bundle therebetween. The surfaces of conveyors 71a, 71b are designed to have a low coefficient of sliding friction to prevent the bundles from being damaged by the conveyors and vice versa when a bundle is being held and the conveyor continues to move. The upstream ends of the holding plates 81c-1 and 81c-2 are provided with outwardly directed portions 81c-1a and 81c-2a which serve to guide a bundle therebetween. As bundles are delivered to the pusher 84 for pushing bundles off of conveyors 71a, 71b, to drive bundles onto a movable platform, holding assemblies 80b and 80c each temporarily hold a bundle delivered thereto until the pusher assembly (to be more fully described) has pushed the previous pair of bundles onto a platform for delivery to a cart.

After the pusher 84 is returned to the start position, the holding assemblies 80b and 80c release the bundles held thereby, moving them into position for delivery by the pusher. Bundle holding assembly 80a functions in the same manner and holds a third bundle which may be delivered thereto during the time that the pusher assembly is pushing a pair of bundles previously delivered to the pusher onto a platform for ultimate delivery into a cart.

Belts 75, secured to the cart loader frame, prevent bundles from falling in the event that bundles are accidently moved to the region of the pusher 84 when it is returning to the start position.

A pusher assembly 82, comprised of a pusher bar 84, is driven by a servo motor 84 which rotates a pulley 86 through a pulley 88 coupled to the output of servo motor 84 thereby driving pulley 90, coupled to a shaft 95, by belt 92. Pulley 86 drives a belt 94 entrained about pulley 84 and a pulley 96, causing the pusher to be moved in a direction shown by arrow D for pushing a pair of bundles onto a platform 98 and is reversible to drive the pusher 84 in the direction shown by arrow E to return to a start position in readiness for pushing another pair of bundles onto platform 98. Belt 94 is clamped to the 82a top of the pusher assembly by clamp 82b.

Pusher 84 is maintained in alignment by a pair of cylindrical-shaped rods 99a, 99b which are secured to the bundle loading frame and which pass through bushings provided within the pusher 84.

The platform 98 is preferably comprised of a pair of platform halves 98a, 98b, each of which is comprised of a plurality of elongated, spaced, parallel freewheelingly rotated rollers, each platform half being driven by a cylinder 100a, 100b to move the platform halves 98a, 98b together and apart. The platform halves are normally together to receive a pair of bundles thereon and are pulled apart to drop bundles delivered thereto into a cart arranged below the platform halves.

The preferred manner for delivering bundles is to deliver a pair of bundles to pusher 84 and push these bundles all the way onto the platform i.e. to the right-hand half of the platform 98. A second pair of bundles is delivered to the pusher, after it has delivered a pair of bundles and returned to the start position, at which time the second pair of bundles are pushed onto the remaining half of the platform halves 98a, 98b.

A fork-type lifting/lowering assembly 102 is provided for selective entry of the tines 104 thereof into and out of one side of a cart in a manner similar to that disclosed in U.S. Pat. No. 5,181,820. The tines are selectively inserted into and removed from a cart by means of a hydraulic motor 106 of a bi-directional-type which drives a gear 108. Gear 108 meshes with a rack 110a arranged on the underside of a rod 110 whereby when hydraulic motor 106 rotates in a first direction, the tines 104 moves into a cart and when hydraulic motor 106 is rotated in the opposite direction, at the time the tines are removed from the cart. It should be noted that motor 106 moves together with the movement of the tines 104.

The lifting/lowering assembly 102 is selectively raised and lowered by means of a pair of hydraulically driven cylinders 113, 115 arranged adjacent to the vertically aligned supports 112, 114. Since the cylinder assemblies are substantially identical in design and function, only one of these assemblies will be described here in detail, for purposes of simplicity.

Cylinder 113 is provided with a rod 113a having a pulley 113b arranged in its upper end. An elongated flexible cable 116 has its lower end 116a joined to the frame and has its intermediate portion entrained about pulley 112a. The free end 116b of flexible cable 116 is joined to lifting/lowering assembly 102. As the cylinder lowers its piston rod, the assembly 102 is lowered by gravity. As the cylinder raises its piston rod, the assembly 102 is raised, the assembly 102 moving approximately double the linear distance moved by the piston rod in both the lifting and lowering directions.

Rollers 120 freewheelingly mounted upon assembly 102 are arranged on opposite sides of vertical member 112[1] to rollingly engage the member 112 and thereby maintain assembly 102 in proper alignment and assure smooth movement thereof as it is lifted and lowered.

The manner in which the lifting/lowering assembly 102 operates, is similar to that described in U.S. Pat. No. 5,181,820. Therefore only a brief description will be provided herein for purposes of simplicity.

When a cart is positioned beneath the bundle loading platform 98, the first pair of bundles are moved in front of pusher 84. These bundles are then pushed all the way onto platform 98. The pusher 84, after pushing the bundles onto the platform 98, returns to the start position whereupon the second pair of bundles held from moving to the region in front of pusher 84, are released and delivered to the pusher 84 by the conveyor 71. These two (2) bundles are pushed onto the platform to occupy the remaining empty space of the platform. Four bundles (arranged in a two-by-two array) are then dropped into the cart by moving the platform halves 98a, 98b apart by means of cylinders 100a, 100b.

Prior to dropping of the bundles, the tines 104 are inserted into one side of the cart so as to be positioned to receive the bundles thereon. The cylinders 113, 115 are operated to position the tines at a height which is preferably a close distance below the underside of the platform assembly 98.

When the platform halves are separated, the bundles drop onto the tines 104 and are supported thereby. Thereafter, the assembly 102 is lowered by a distance of the order of one bundle height whereupon a second group of four bundles arranged two by two in the manner described hereinabove are delivered to the platform assembly 98 which is again separated so as to drop the four bundles upon the first array of four bundles delivered to the tines. The tines 104 of assembly 102 are then lowered by a distance substantially equal to a height of a bundle in readiness for receiving a third layer of bundles. When all the bundles have been delivered to the cart, assembly 102 will move to its lowest position at which time the tines are withdrawn from the cart. The sides of the cart through which the tines have been inserted act to retain the bundles within the cart even though the tines are withdrawn therefrom.

Frame 119 is then returned to the upper starting position by operation of the cylinders 113, 115 in readiness for loading another cart.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A cart storage and delivery system comprising:
   at least one infeed conveyor and one outfeed conveyor for receiving wheeled carts;
   a cross-conveyor for moving carts received from an output end of the infeed conveyor to an input end of said outfeed conveyor;
   said infeed and outfeed conveyors each having an upper run engaging a bottom of a cart delivered to an input end thereof and advancing the delivered carts to an output end; and
   said upper runs maintaining a cart at a height so that the wheels of the cart do not support the cart.

2. The system of claim 1 wherein said infeed and outfeed conveyors each have a conveyor belt of a width which is less than a distance between a first pair of wheels along one side of said cart and a second pair of wheels on an opposite side of said cart.

3. The system of claim 1 wherein said cross-conveyor has an upper run arranged at a level below the height of said infeed conveyor to receive and support all wheels of a cart delivered by the infeed conveyor.

4. The system of claim 3 wherein said cross-conveyor is tilted so that a cart delivered to the cross-conveyor moves away from the infeed conveyor toward a stop member.

5. The system of claim 4 further comprising a sensor operating said cross-conveyor to move a cart engaging the sensor toward a position along the cross-conveyor aligned with an input end of said outfeed conveyor.

6. The system of claim 5 further comprising a second sensor for stopping the cross-conveyor when a cart on the cross-conveyor is aligned with the input end of said outfeed conveyor.

7. The system of claim 6 further comprising pusher means responsive to said second sensor to push a cart activating the second sensor onto the input end of the outfeed conveyor.

8. The system of claim 7 wherein the upper run of said infeed conveyor has a surface engaging an undersurface of a cart which has a coefficient of friction selected to enable movement of the upper run relative to a cart held by a blocking member.

9. The system of claim 1 wherein said infeed conveyor has a plurality of cart storage positions therealong;
   a blocking member displaced from a path along which carts move when advanced by the infeed conveyor and movable to a blocking position for stopping a cart when a cart is in a cart position just upstream of the blocking member.

10. The system of claim 1 wherein said infeed conveyor has an inclined loading ramp for lifting a cart pushed along the loading ramp toward the infeed conveyor so that an underside of a cart is raised to a height which is sufficient to place the underside of the cart in engagement with the upper run of the infeed conveyor.

11. The system of claim 10 further comprising a sensor for operating the infeed conveyor to move a cart toward said cross-conveyor when a cart reaches a given position along said inclined loading ramp.

12. The system of claim 11 wherein the upper run of said infeed conveyor has a surface engaging an undersurface of a cart which has a coefficient of friction selected to enable movement of the upper run relative to a cart held by a blocking member.

13. The system of claim 1 wherein said outfeed conveyor has a cart loading position intermediate the input and output ends thereof;
   a blocking member displaced from a path of movement of carts along the outfeed conveyor and movable to a blocking position to stop a cart moved to the loading position.

14. The system of claim 1 further comprising a cart loader for dropping bundles into an open upper end of a cart delivered to a cart loading position by said outfeed conveyor.

15. The system of claim 14 wherein said cart loader comprises:
   a platform having an opening positioned above the open end of the cart in the cart loading position;
   a movable member having a first position supporting a bundle delivered thereto above the platform opening and movable to a second position for dropping a bundle through said platform opening into the cart;
   a bundle conveyor for delivering bundles along a path to a transfer location adjacent to said platform;
   a pusher movable across said bundle conveyor for pushing a bundle at said transfer location toward said platform opening;
   blocking means along said bundle conveyor displaced from bundles moving along said bundle conveyor and movable to a position to prevent movement of a bundle at a position upstream of said transfer location when said pusher is moving across said bundle conveyor.

* * * * *